May 1, 1951 J. P. BERNARD 2,550,904
CONVEYER HOIST
Filed April 6, 1948 2 Sheets-Sheet 1
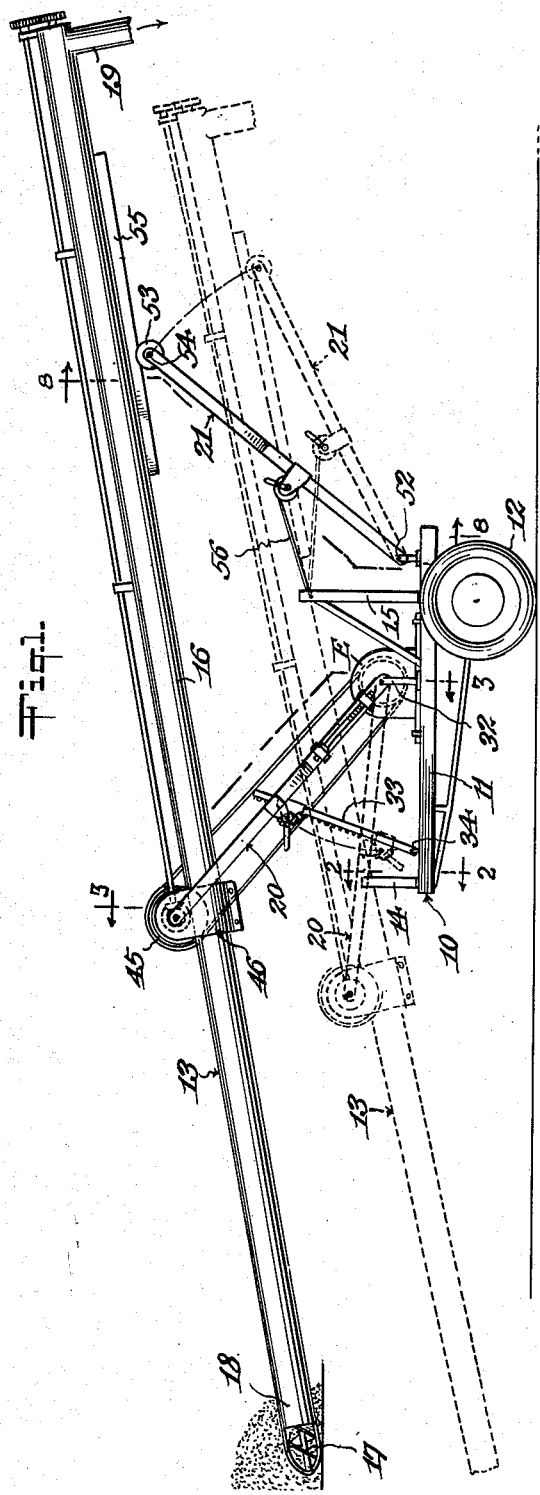
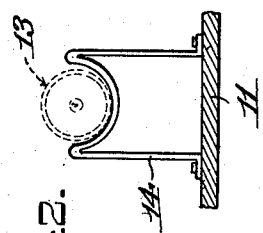
INVENTOR.
Joseph P. Bernard
BY
Munn, Liddy & Glaccum
Attorneys May 1, 1951 J. P. BERNARD 2,550,904
CONVEYER HOIST
Filed April 6, 1948 2 Sheets-Sheet 2
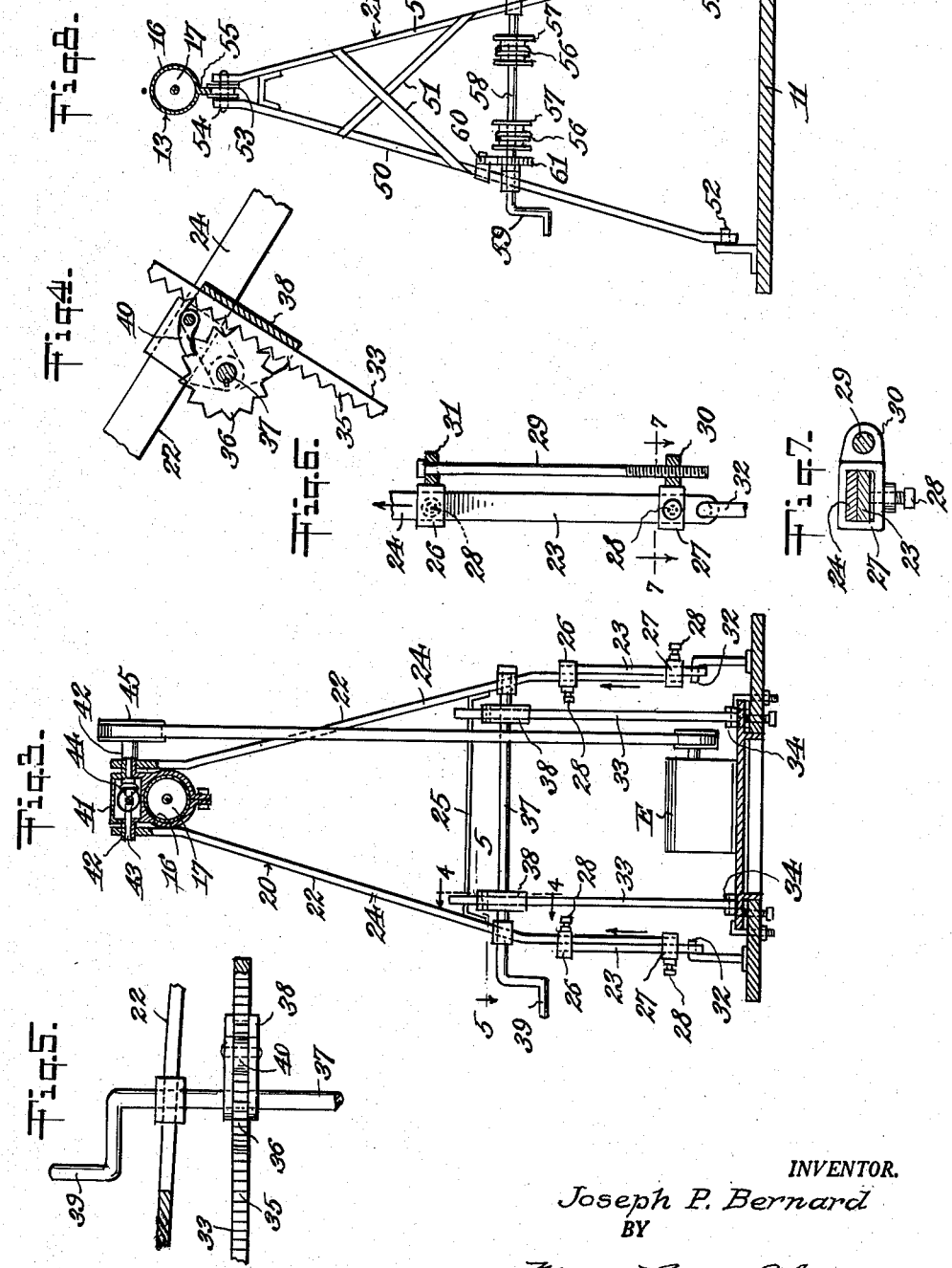
INVENTOR.
Joseph P. Bernard
BY
Munn, Liddy & Glaccum
Attorneys Patented May 1, 1951

2,550,904

UNITED STATES PATENT OFFICE 2,550,904

CONVEYER HOIST

Joseph P. Bernard, Scobey, Mont., assignor to
Daniel C. Murphy, Sauk Centre, Minn.

Application April 6, 1948, Serial No. 19,337

1 Claim. (Cl. 198—233)

This invention relates to a mobile apparatus for conveying small grains or other materials from a pick up area and discharging the material at different elevations.

The present invention has especial reference to a hoist arrangement which may be used advantageously in conjunction with a mobile engine truck and an overhead type of conveyor for the raising, lowering and the angular adjustment of the conveyor.

Some of the objects and advantages of the present invention are as follows: The conveyor may be raised, lowered or tilted into different positions of operation. The engine platform will remain horizontal regardless of the working angle of the conveyor, so that the engine for furnishing power to the conveyor is kept in a proper running position. The power and motion transmission means between the engine and the conveyor adjusts itself to any working angle of the conveyor.

With the foregoing, other objects and advantages will appear when the following specification is read in conjunction with the accompanying drawings, in which:

Fig. 1 is a side view of a mobile conveyor hoist embodying the features of the present invention, the conveyor being shown in an elevated position in full lines, and in its lowered position for transportation in dotted lines.

Fig. 2 is an enlarged detail sectional view taken on the line 2—2 of Fig. 1.

Fig. 3 is an enlarged sectional view taken on the line 3—3 of Fig. 1.

Fig. 4 is a fragmentary sectional view taken on the line 4—4 of Fig. 3.

Fig. 5 is a fragmentary sectional view taken on the line 5—5 of Fig. 3.

Fig. 6 is a fragmentary sectional view showing certain details for changing the length of one of the booms.

Fig. 7 is a sectional view taken on the line 7—7 of Fig. 6.

Fig. 8 is an enlarged sectional view taken on the line 8—8 of Fig. 1.

Shown in the drawings is a mobile truck 10 comprising a deck or platform 11 having traction wheels 12. The truck is designed and adapted to be hitched or coupled by any suitable means to a traction or other power driven or horse drawn vehicle for transportation from place to place.

In accordance with the invention a conveyor 13 is adjustably supported above the platform 11 by a hoist arrangement connected with the platform. The conveyor 13 when not in use rests upon a cradle comprising spaced supports 14 and 15 fixed to the platform and extending upwardly therefrom. The support 14 is of less height than the support 15. The support 14 is at the front end of the platform and the support 15 is forward of the rear end of the platform.

The conveyor 13 in the present instance is a screw or auger type for handling small grains. It is to be understood other types of conveyors may be used for picking up and discharging various materials where desired. The screw or auger type of conveyor shown, generally stated, comprises a tube 16 of any suitable length and a screw 17 which rotates in the tube to convey the grain from the inlet end 18 of the tube out of the angular discharge end 19. The tube 16 is arranged lengthwise of the platform above it, the inlet end 18 being at the front and the discharge end at the rear.

The hoist arrangement for the conveyor 13 comprises booms 20 and 21 and their counterparts for adjusting and retaining the booms in different angular positions with respect to the platform 11. The boom 20 comprises two arms 22 each consisting of lower and upper sections 23 and 24. The sections 24 are connected by a cross piece 25. Guides 26 and 27 are secured to the respective upper and lower ends of the lower and upper sections 23 and 24. The sections 23 extend through the guides 27 for sliding movement, and the sections 24 likewise extend through the guides 26 for sliding movement for the purpose of increasing or decreasing the length of the boom 20. Clamp screws 28 carried by the guides 26 and 27 retain the upper sections 24 in their adjusted relation to the sections 23. For adjusting the sections 24, use is made of screw bolts 29 in threaded engagement with lugs 30 on the guides 27, and said bolts extending loosely through lugs 31 on the guides 26, as shown in Fig. 6. These bolts 29 also help in retaining the adjustment of the sections 23 and 24. The lower ends of the sections 23 are connected with pivots 32 fixed on the platform 11 so that the boom 20 pivots on a transverse axis with respect to the platform. The pivots 32 are disposed at opposite sides of the platform intermediate the ends thereof. It will now be understood that the boom 20 projecting upwardly from the platform 11 may be moved into different angular positions in relation to the platform 11.

In order to move the boom 20 into the desired angular position, and to secure it therein, use is made of bars 33 having their lower ends pivotally connected with the platform 11, as at 34. The bars 33 have straight gear racks 35 thereon which mesh with gears 36 fast on a shaft 37 mounted for rotation in bearings carried by the arms 22. The bars 33 are slidably received in guides 38 connected with the shaft 37 for pivotal movement. A crank handle 39 on the shaft 37 serves for rotating it. A pawl 40 carried by the guide 38 adjacent the handle 39 serves for dogging the related gear 36 to prevent rotation of the gears, thereby securing the boom 20 in the adjusted angular position.

In accordance with the invention, the transverse axis provided by the pivots 32 will be disposed coaxially with the axis of the crank shaft of an engine adjustably mounted on the platform 11. The engine of any suitable type, such as an internal combustion engine, is shown in a general manner, and is designated E.

The upper ends of the arms 22 of the boom 20 support between them a casing 41 whose bearings 42 support a driven shaft 43 having a gear 44 and a grooved pulley 45, the gear being disposed within the casing and the pulley being disposed exteriorly thereof. A power transmission belt encircles the pulley 45 and a pulley on one end of the engine crank shaft. A wide clamping band 46 secured to or formed integral with the casing 41 embraces the conveyor tube 16 in clamping engagement therewith. The bearings 42 extending through the upper ends of the arms 22 serve as pivots, so that the boom 20 has pivotal movement with respect to the driven shaft 43 constituting a part of the power and motion transmission mechanism connected with the feed screw 17 of the conveyor. All parts of said mechanism have not been fully shown since the mechanism is not claimed herein. It will be understood however that power and motion may be transmitted from the engine to the screw 17 in any angular position of the conveyor 13 and the boom 20. By adjusting the length of the boom 20 the belt may be kept at the proper tension. Regardless of the adjusted length of the boom 20 it is preferably kept shorter than the boom 21.

The boom 21 comprises two arms 50 secured together by suitable bracing 51. The lower ends of the arms 50 are connected with pivots 52 fixed on the platform 11 at or near the near end thereof. A groove wheel 53 is mounted between the upper ends of the arms 50 on a shaft 54 carried by said upper ends. The wheel 53 is in rolling contact with a straight flange or rail 55 extending longitudinally of the tube 16 on the underside thereof. The pivots 52 are at opposite sides of the platform and provide a transverse axis with respect to the platform 11. Therefore, the boom 21 is movable into different angular positions on a transverse axis in relation to the platform 11. It follows that the tube 16 may move longitudinally, or rock with respect to the boom 21, or the boom may have angular movement with respect to the tube 16.

In order to move the boom 21 into different angular positions, and to retain it therein, use is made of cables 56 each having one end secured to the support 15 and its opposite end secured to a spool 57 fast on a shaft 58 supported by bearings carried by the arms 50. A crank handle 59 on one end of the shaft 58 serves for rotating it together with the spools 57. A pawl 60 on the arm 50 adjacent the handle 59 coacts with a toothed wheel 61 fast on the shaft 58 preventing the cables 56 from unwinding. When the pawl 60 is retracted the handle 59 may be manipulated to wind the cables on the spools or to unwind them in adjusting the boom 21.

From the foregoing it is obvious that the conveyor 13 is suspended from the top of the boom 20 and is upheld by the upper end of the boom 21 through the intervention of the wheel 53.

In attaining the desired angular position of the conveyor 13, one or both booms may be angularly adjusted. When changing the angular position of the boom 20 alone, to change the working angle of the conveyor 13, the rail 55 rides on the wheel 53 and at the same time the boom 21 upholds its end of the conveyor 13.

Raising, lowering and adjusting the angle of the conveyor are easily accomplished. The platform of the truck remains horizontal not only while carrying out the above operations, but while the conveyor is disposed at any working angle, or is at rest on the supports 14 and 15 and being transported. This is important because when the conveyor is in operation with the platform 11 horizontal, the engine is maintained in a proper position for its efficient and effectual operation.

I claim:

A mobile apparatus of the character described, including the combination of an engine platform having traction wheels, a cradle comprising spaced fixed supports extending upwardly from the platform, a conveyor arranged lengthwise of the platform, and a hoist arrangement for raising said conveyor from said cradle into different angular positions and for lowering the conveyor into said cradle while keeping the platform horizontal, said hoist arrangement comprising a short boom having its lower end connected with the platform between said supports for angular movement on a transverse axis with respect to the platform, the upper end of the boom pivotally connected with the conveyor, a long boom having its lower end connected with the platform at or near one end thereof for angular movement on a transverse axis with respect to said platform, the upper end of the long boom having means in rolling contact with said conveyor, means carried by the long boom and connected with one of said supports to hold the boom in different angular positions, and means connected with the platform and engaged with the short boom to hold the boom in different angular positions.

JOSEPH P. BERNARD.

REFERENCES CITED

The following references are of record in the file of this patent:

UNITED STATES PATENTS

| Number | Name | Date |
|---|---|---|
| 390,016 | Gilmore | Sept. 25, 1888 |
| 431,724 | Nagle | July 8, 1890 |
| 697,578 | Weaver | Apr. 15, 1902 |
| 891,140 | Brown et al. | June 16, 1908 |
| 1,114,425 | Adams | Oct. 20, 1914 |
| 1,750,855 | Neighbour | Mar. 18, 1930 |
| 1,808,237 | Liggett | June 2, 1931 |
| 2,355,711 | Dolyniuk | Aug. 15, 1944 |
| 2,387,189 | Steinmetz | Oct. 16, 1945 |
| 2,395,410 | Kaesler | Feb. 26, 1946 |
| 2,397,420 | Jorgensen | Mar. 26, 1946 |
| 2,492,341 | Walters | Dec. 27, 1949 |
| 2,516,360 | Adams | July 25, 1950 |

FOREIGN PATENTS

| Number | Country | Date |
|---|---|---|
| 480,613 | Great Britain | Feb. 25, 1938 |